April 4, 1967  G. E. LEADBETTER ET AL  3,312,483
PIPE CONNECTOR
Filed Aug. 17, 1960
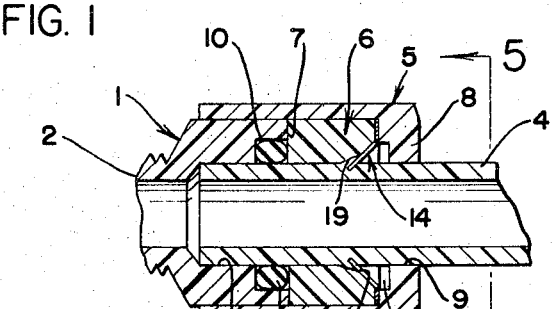
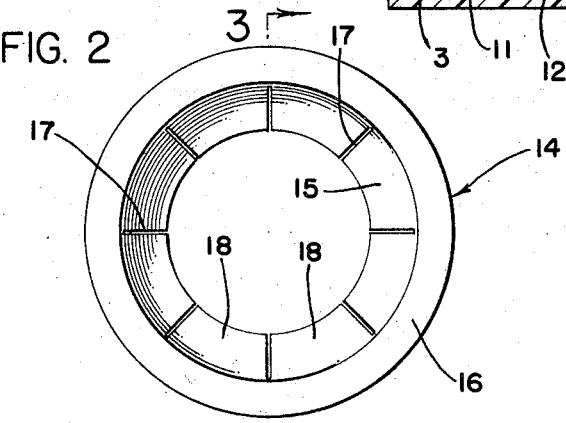
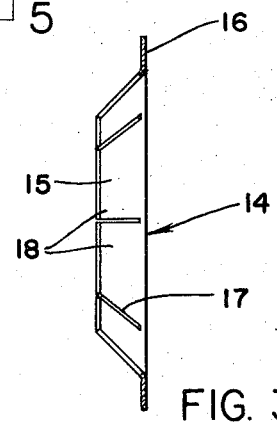
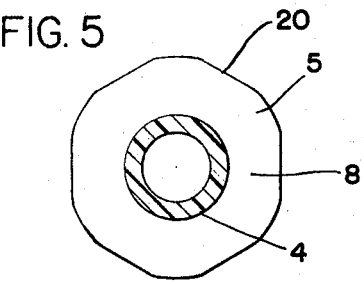
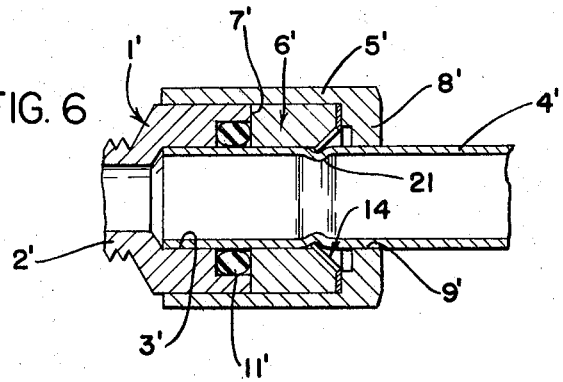
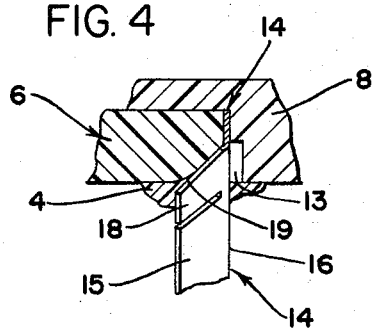
INVENTORS
GILBERT E. LEADBETTER
& JIM A. RICE
BY
Oberlin, Maky & Donnelly
ATTORNEYS

United States Patent Office 3,312,483
Patented Apr. 4, 1967

3,312,483
PIPE CONNECTOR
Gilbert E. Leadbetter and Jim A. Rice, Mansfield, Ohio, assignors, by mesne assignments, to D and G Plastics, Co., Kent, Ohio, a corporation of Ohio
Filed Aug. 17, 1960, Ser. No. 50,274
5 Claims. (Cl. 285—340)

This invention relates generally, as indicated, to a pipe connector and more particularly to an improved form of the connector shown in United States Letters Patent 2,831,711 dated Apr. 22, 1958.

The coupling or connector disclosed in said patent essentially comprises a body having a socket or opening for insertion of a pipe end and the like and a locking ring so formed and held in a groove within the socket as to permit forced passage of the pipe therethrough while locking the same against withdrawal by a biting action. The locking ring is of a frusto-conical shape with its smaller end innermost and adapted to bite into an inserted pipe, upon any attempted withdrawal of the same, at an acute angle; in the case of a plastic pipe and the like, this biting action results in a paring and outward wedging of the pipe material against the surrounding wall. In order to provide a seal with the pipe, an O-ring is also provided in a groove in the socket to engage about the inserted pipe end inwardly with respect to the locking ring.

It is a principal object of this invention to simplify production of such a connector while ultilizing the locking principle and operation thereof to full advantage.

It is a further object of this invention to provide such a connector in which a plurality of components are employed in the body formation thereof, these being of special design and interfitting nature to facilitate the internal accomodation of the locking and sealing rings.

It is yet another object of the invention to provide an improved form of locking ring in the new connector to enhance the efficiency thereof, with particular regard to the problem of variation in pipe external diameter which has been encountered especially in the handling of plastic pipe.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In said annexed drawing:

FIG. 1 is a longitudinal sectional view of a pipe fitting or connector in accordance with the present invention and applied to the end of a length of plastic pipe;

FIG. 2 is a plan view of the locking ring employed with such pipe fitting;

FIG. 3 is a sectional view of such locking ring taken on the line 3—3 of FIG. 2;

FIG. 4 is a fragmentary enlarged detail view of a portion of the fitting shown in FIG. 1;

FIG. 5 is a sectional view of the FIG. 1 fitting taken on the line 5—5 thereof;

FIG. 6 is a view similar to FIG. 1 wherein the pipe is made of metal.

Referring now to the annexed drawing and more particularly to the FIG. 1 embodiment of the invention, it will be seen that the pipe fitting comprises an adaptor 1 having an externally threaded nipple 2 on one end thereof. The adaptor defines a recess 3 for insertion of pipe or tube 4 therein at the opposite end. A cap 5 is placed over the adaptor 1 and encloses a clamping ring 6 between the end face 7 of the adaptor and outer end wall 8 of the cap. Such wall of the cap is provided with an aperture 9 through which the pipe 4 extends and then passes through the ring 6 to seat in the adaptor 1.

The outer end of the adaptor 1 is provided with an internal groove 10 in which an O-ring 11 is seated to form a seal between the pipe 4 and the adaptor. The inner end wall of the clamping ring 6 abuts the outer end of the adaptor and thus completes the seating groove for the O-ring 11. At the opposite or outer end of the clamping ring, an inner corner bevel 12 is provided cooperating with the inner surface 13 of the cap end wall 8 to seat and firmly hold a locking ring 14 therebetween.

The locking ring is illustrated in more detail in FIGS. 2 and 3 and has a frusto-conical section 15 and an integral outwardly directed annular flange portion 16 which is in a plane normal to the ring axis. The frusto-conical portion 15 of the ring 14 may be provided with a series of radially and axially extending slits 17 which define a plurality of tabs 18. This ring is preferably made of a stainless steel having the normal resiliency of such metal at the illustrated gauge, and it can be seen that the tabs 18 will flex outwardly a certain degree readily to pass a pipe 4 having a slightly larger outside diameter than the inside diameter of the frusto-conical portion 15.

The ring is of a size such that its normal smallest diameter, at the inner end, is somewhat less than the inner diameter of the clamping ring 6 and also slightly less than the outside diameter of the tube or pipe 4. The depth and cross-sectional shape of the groove formed between the clamping ring and the end wall of the cap are such to accommodate the ring as illustrated. It will be seen that once the ring is inserted within the beveled groove 12, the further flexure of the tabs 18 outwardly or to the left as seen in FIGS. 1 and 3 will be precluded except at the extreme ends thereof due to the contact of the ring portion 15 with the sloping wall of groove 12. Since the annular flange of this ring is tightly held or clamped, the ring cannot move bodily inwardly. Attempted axial withdrawal of the pipe 4 will, however, cause the tabs 18 to swing inwardly thus biting into the pipe 4. The plastic material of the pipe will tend to flow between the tabs 18 and the sloping wall of groove 12 as shown at 19 even further to accentuate the biting of tabs 18 into pipe 4 and to produce a wedging action.

In FIG. 1, the length of the plastic pipe 4 is shown in locked condition in the fitting, with the wall thickness of this pipe being approximately equal to the increase in internal diameter of the adaptor from the nipple 2 to the body portion thereof. In this manner, the assembled pipe and adaptor will have substantially the same internal diameter. The cap 5 will, of course, be secured to the adaptor 1 in the illustrated assembled relation of the connector, for example, by cementing, by solvent welding in the case of plastic material, or by any other suitable fastening expedient. As shown in FIG. 5, such cap may be provided with external flats 20 to give it a hexagonal configuration.

As indicated by the sectioning, the fitting of FIG. 1, as well as the pipe, is shown as being made of plastic. It may, however, also be made of metal, as indicated in FIG. 6 wherein the pipe is also made of metal. In this case, as before, adaptor 1' is provided with a threaded nipple 2' and has an annular enlarged internal bore 3' to accommodate a thin walled metallic pipe or tube 4'. The cap 5' encloses the clamping ring 6' to abut against the end 7' of the socket 1' and is provided with an end wall 8' having an aperture 9' slightly larger than the external diameter of the pipe 4'. The identical locking ring 14 may be employed with the tabs 18 engaging the outer periphery of the pipe 4' and an identical sealing ring 11 is also employed in the same manner. In some cases, it may be found desirable to provide the inserted end of the pipe length with an inwardly directed groove or bead for such engagement therein by the locking ring, and such groove is here shown at 21. It is noted that the metallic parts shown in FIG. 5 are otherwise identical in form to the plastic parts shown in FIG. 1.

It will be seen that the new pipe or tubing connector will function in positive and foolproof manner, with a minimum of labor for assembly. The manufacture of the device in particular is well-suited for practical and economical production techniques especially in regard to proper placement of the internal locking and sealing rings, a factor which is obviously critical for the intended use of the connector with best efficiency. The locking ring is not only unvariably properly located, and firmly anchored, it has been demonstrated that the noted limited expansibility provided by the radial slits therein off-sets or compensates for variations in the outside diameter of different lengths of pipes or tubing of the same nominal size, a condition which is, as earlier noted, common in plastic pipe.

Other modes of applying the principle of the invention may be employed, change being made as regards the details described, provided the features stated in any of the following claims or the equivalent of such be employed.

We, therefore, particularly point out and distinctly claim as our invention:

1. In a connector of the character described, a hollow body section terminating in a socket, the inner surface of which is cylindrical, said socket being adapted to fit closely over the end of a pipe and the like to be joined with the connector, an annular sealing ring groove being provided in the end face of such inner cylindrical surface of the socket at a region normally embracing such pipe end and the like, a clamping ring abutting such end face of the socket, the outer end of said clamping ring being formed with an inner bevel, a locking ring of frusto-conical shape with a flange at its outer end directed outwardly substantially at right angles to the axis of the ring, said locking ring being disposed against the outer beveled end of the clamping ring, and a cap fitted over the clamping ring and socket portion of the connector body section, said cap having an apertured end wall contacting the flange of the locking ring to clamp the same, the smaller end of the ring being innermost and projecting beyond the inner periphery of the clamping ring tightly to grip a pipe end and the like inserted therethrough, the locking ring permitting forced passage of a pipe end but biting into the same upon any attempted withdrawal to preclude separation thereof from the connector.

2. The combination set forth in claim 1 wherein the frusto-conical portion of said locking ring is radially slit to facilitate expansion and contraction of the inner diameter of said locking ring.

3. The combination set forth in claim 1 further a seal ring positioned in said groove and wherein said clamping ring forms a lateral closure for the groove in which the sealing ring is disposed.

4. A coupling unit for use with flexible hose comprising a coupling body having a central bore, a counter bore of larger diameter than said central bore concentric therewith and joined thereto by a radially extending annular wall at one end of said coupling body; a seal member disposed within and filling said counter bore; a cap secured on said coupling body; an apertured ring having a flat outer periphery and a central conical surface housed within said cap; a thrust member also housed within said cap, said thrust member having one end in engagement with said sealing member and one end in engagement with said ring, said ring and the end of said thrust member in engagement therewith including outer annular planar surfaces in concentric relation, said thrust member further including, at the end in engagement with said ring, a conical central surface to accommodate the central conical surface of said ring the vertex angle of the former conical surface approaching the vertex angle of the latter conical surface allowing movement of the edge of the conical surface of said ring inwardly toward the bore in said coupling body; the conical surface of said ring being flexibly yieldable and terminating in a circular gripping edge having a diameter slightly less than the diameter of the hose to be coupled to facilitate insertion of the end of a hose into said coupling body through said ring by flexure of said conical surface and prevent removal of said hose end by penetrating contact of the gripping edge of said ring on the exterior of said hose, said cap including annular means engaging the flat outer periphery of said ring to retain said ring, said thrust member and said seal in assembled concentric relation with respect to said coupling body.

5. A coupling unit as defined in claim 4, wherein the central conical portion of said ring is radially slit to facilitate flexure of said conical surface upon insertion of the end of the hose.

References Cited by the Examiner
UNITED STATES PATENTS

| 2,158,757 | 5/1939 | Kuestermeier | 285—340 |
| 2,284,365 | 5/1942 | Briegel | 285—340 |
| 2,444,380 | 6/1948 | Shinek | 285—340 |
| 2,452,278 | 10/1948 | Woodling | 285—348 |
| 2,469,851 | 5/1949 | Stecher et al. | 285—382.7 |
| 2,831,711 | 4/1958 | Leadbetter | 285—382 |
| 2,999,701 | 9/1961 | Blair et al. | 285—340 |

FOREIGN PATENTS 863,881  3/1952  Germany.

CARL W. TOMLIN, *Primary Examiner.*

E. C. ALLEN, *Examiner.*

D. W. AROLA, S. R. MILLER, H. C. BOURNE, H. N. KAGAN, *Assistant Examiners.*